US010866925B2

(12) United States Patent
Barisoff et al.

(10) Patent No.: US 10,866,925 B2
(45) Date of Patent: Dec. 15, 2020

(54) APPARATUS AND METHOD FOR IMPROVED NETWORK DATA SECURITY ENFORCEMENT AND VERIFICATION

(71) Applicant: Optum, Inc., Minnetonka, MN (US)

(72) Inventors: Wade Barisoff, Plymouth, MN (US); John Glomstad, Plymouth, MN (US)

(73) Assignee: Optum, Inc., Minnetonka, MN (US)

( * ) Notice: Subject to any disclaimer, the term of this patent is extended or adjusted under 35 U.S.C. 154(b) by 224 days.

(21) Appl. No.: 15/926,924

(22) Filed: Mar. 20, 2018

(65) Prior Publication Data

US 2019/0294696 A1 Sep. 26, 2019

(51) Int. Cl.
*H04L 29/06* (2006.01)
*G06F 16/11* (2019.01)

(52) U.S. Cl.
CPC .......... *G06F 16/122* (2019.01); *H04L 63/123* (2013.01); *H04L 63/20* (2013.01)

(58) Field of Classification Search
CPC ..... G06F 16/122; H04L 63/123; H04L 63/20; H04L 63/1416
See application file for complete search history.

(56) References Cited

U.S. PATENT DOCUMENTS

| 6,697,944 | B1* | 2/2004 | Jones .................... G06F 21/10 705/50 |
| 8,738,604 | B2 | 5/2014 | Devarajan et al. |
| 8,914,892 | B2 | 12/2014 | Karande et al. |
| 9,323,949 | B2 | 4/2016 | Gupta et al. |
| 9,330,273 | B2 | 5/2016 | Khetawat et al. |
| 9,397,981 | B2 | 7/2016 | Hinton et al. |
| 9,553,860 | B2 | 1/2017 | Meyer |
| 9,665,722 | B2 | 5/2017 | Nagasundaram et al. |
| 2005/0216794 | A1* | 9/2005 | Yagawa ................... G06F 21/79 714/42 |
| 2005/0288939 | A1* | 12/2005 | Peled ....................... G06F 21/10 709/229 |
| 2006/0168450 | A1* | 7/2006 | Yagawa ............... H04N 1/2179 713/176 |
| 2010/0042626 | A1* | 2/2010 | Verma ................. G06F 16/1865 707/607 |
| 2010/0043048 | A1* | 2/2010 | Dolby ..................... G06F 21/53 726/1 |
| 2011/0239113 | A1 | 9/2011 | Hung et al. |
| 2014/0068706 | A1 | 3/2014 | Aissi |
| 2016/0110370 | A1* | 4/2016 | Wetherall ............... G06F 16/93 707/825 |
| 2016/0285835 | A1 | 9/2016 | Linga et al. |
| 2016/0344556 | A1 | 11/2016 | Chao et al. |

(Continued)

OTHER PUBLICATIONS

Zhang et al., "DSwitch: a dual mode direct and network attached disk", SoCC '15: Proceedings of the Sixth ACM Symposium on Cloud Computing, August, pp. 71-83 (Year: 2015).*

*Primary Examiner* — Morshed Mehedi
(74) *Attorney, Agent, or Firm* — Alston & Bird LLP

(57) ABSTRACT

An apparatus, method, and computer program product for the improved identification of files subject to data loss prevention protocols in a network environment. Some example implementations provide for the generation and presentation of consolidated file sets in a user interface that allows a user to take direct action to operate on one or more files to enforce and/or otherwise comply with detected violations of data security protocols.

14 Claims, 7 Drawing Sheets

(56) References Cited

U.S. PATENT DOCUMENTS

2017/0091680 A1    3/2017   Rosenthal et al.
2018/0275881 A1*   9/2018   Ashraf .................... G06F 3/065
2019/0286839 A1*   9/2019   Mutha ................. G06F 16/2228

* cited by examiner

600

| <Date> | <Time> | <Action Description A> | <Action Description B> |
|---|---|---|---|
| . | . | . | . |
| . | . | . | . |
| . | . | . | . |
| . | . | . | . |
| . | . | . | . |
| . | . | . | . |
| . | . | . | . |
| . | . | . | . |
| <Date> | <Time> | <Action Description A> | <Action Description B> |

APPARATUS AND METHOD FOR IMPROVED NETWORK DATA SECURITY ENFORCEMENT AND VERIFICATION

TECHNICAL FIELD

An example embodiment relates generally to network security, particularly in the context of the enforcement of data security protocols in networked environments and the verification of responsive actions taken in compliance with such data security protocols. Example implementations are particularly directed to systems, methods, and apparatuses for efficiently identifying potential security vulnerabilities associated with files stored on networked workstations, escalating the resolution of such potential security vulnerabilities, and documenting the responsive resolution of such potential security vulnerabilities.

BACKGROUND

Effectively protecting and maintaining the security of data has become more important than ever in today's modern network environments, where many individuals and other entities rely on the ready access and use of electronic records and other files to store, move, use, and exchange potentially sensitive information. While the use of electronic files in a networked environment has facilitated the efficient delivery of improved services to large populations, the use of communications networks and network workstations to view, process, store, and move potentially sensitive information associated with individuals and other entities has given rise to the need for the development, implementation, and use of network security protocols and other rules associated with the prevention of data breaches and/or other data losses.

In network environments where individuals need to access and/or otherwise work with files that contain potentially sensitive information, the technical challenges associated with protecting network resources from unauthorized access are compounded by the technical challenges associated with ensuring that legitimate users efficiently recognize the potentially sensitive files that may be stored on a given workstation, understand their obligations to adhere to relevant data loss prevention protocols, and take specific, documentable actions to limit the risk to potentially sensitive data. The inventors of the inventions disclosed herein have identified these and other technical challenges, and developed the solutions described and otherwise referenced herein.

BRIEF SUMMARY

An apparatus, computer program product, and method are therefore provided in accordance with an example embodiment in order permit the efficient identification and presentation of files that are subject to data loss prevention protocols. In this regard, the method, apparatus and computer program product of an example embodiment provide for the creation and population of a user interface on a workstation associated with a user that presents the user with an identification of the files that are subject to the relevant data loss prevention protocols in a given network environment. Many of the technical challenges that impede the efficiency of conventional data loss prevention systems are overcome in example embodiments described herein by efficiently de-duplicating system events generated by conventional data loss prevention systems and allowing the user to view and take action on files that are subject to data loss prevention protocols directly from within the generated interface. Moreover, some example embodiments provide for the tracking and/or other recordation of actions taken by a user in a manner that allows for file-level actions taken by a user to be associated with rule- or event-level data structures used and/or generated by data loss prevention systems.

In an example embodiment, a method for securing data files in a network environment is provided, the method comprising: receiving, at a workflow system, a set of event data objects, wherein each event data object within the set of event data objects is associated with a first workstation; compiling a plurality of file information sets, wherein compiling the plurality of information sets comprises extracting, from each event data object within the set of event data objects, a file information set; based at least in part on the plurality of file information sets, generating a consolidated file set associated with the first workstation; causing a representation of the consolidated file set to be displayed on a user interface of the first workstation; receiving an indication of an action performed by a user of the first workstation on a file identified in the consolidated file set; and causing the generation of a record associated with the action performed by the user.

In some example implementations of such a method, each event data object within the set of event data objects is further associated with a detected violation of a file storage protocol. In some such example implementations, and in other example implementations, each file information set comprises an identification of a file name and a file path associated with a file stored on the first workstation. In some such example implementations, and in other example implementations, each file information set further comprises an indication of the detected violation of the file storage protocol. In some such example implementations, and in other example implementations, generating the consolidated file set comprises: determining that a first file information set and a second file information set are associated with the same file stored on the first workstation; and combining the first file information set and the second file information set into a single entry in the consolidated file set.

In some such example implementations, and in other example implementations, causing the representation of the consolidated file set to be displayed on the user interface of the first workstation comprises: presenting a selectable element associated with a file identified in the consolidated file set, wherein the selectable element is configured to, upon selection by the user, cause the first workstation to open the file associated with the selectable element. In some such example implementations, and in other example implementations, causing the generation of the record associated with the action performed by the user comprises causing an indication of the action performed by the user to be associated with each event data object associated with the file.

In another example embodiment, an apparatus for securing data files in a network environment is provided, the apparatus comprising at least one processor and at least one memory comprising computer program code, the at least one memory and the computer program code configured to, with the at least one processor, cause the apparatus to: receive, a set of event data objects, wherein each event data object within the set of event data objects is associated with a first workstation; compile a plurality of file information sets, wherein compiling the plurality of information sets comprises extracting, from each event data object within the set of event data objects, a file information set; based at least in part on the plurality of file information sets, generate a consolidated file set associated with the first workstation;

cause a representation of the consolidated file set to be displayed on a user interface of the first workstation; receive an indication of an action performed by a user of the first workstation on a file identified in the consolidated file set; and cause the generation of a record associated with the action performed by the user.

In some example implementations of such an apparatus, each event data object within the set of event data objects is further associated with a detected violation of a file storage protocol. In some such example implementations, and in other example implementations, each file information set comprises an identification of a file name and a file path associated with a file stored on the first workstation. In some such example implementations, and in other example implementations, each file information set further comprises an indication of the detected violation of the file storage protocol. In some such example implementations, and in other example implementations, generating the consolidated file set comprises: determining that a first file information set and a second file information set are associated with the same file stored on the first workstation; and combining the first file information set and the second file information set into a single entry in the consolidated file set.

In some such example implementations, and in other example implementations, causing the representation of the consolidated file set to be displayed on the user interface of the first workstation comprises: presenting a selectable element associated with a file identified in the consolidated file set, wherein the selectable element is configured to, upon selection by the user, cause the first workstation to open the file associated with the selectable element. In some such example implementations, and in other example implementations, causing the generation of the record associated with the action performed by the user comprises causing an indication of the action performed by the user to be associated with each event data object associated with the file.

In another example embodiment, a computer program product is provided, the computer program product comprising at least one non-transitory computer-readable storage medium having computer-executable program code instructions stored therein, the computer-executable program code instructions comprising program code instructions configured to: receive, a set of event data objects, wherein each event data object within the set of event data objects is associated with a first workstation; compile a plurality of file information sets, wherein compiling the plurality of information sets comprises extracting, from each event data object within the set of event data objects, a file information set; based at least in part on the plurality of file information sets, generate a consolidated file set associated with the first workstation; cause a representation of the consolidated file set to be displayed on a user interface of the first workstation; receive an indication of an action performed by a user of the first workstation on a file identified in the consolidated file set; and cause the generation of a record associated with the action performed by the user.

In some example implementations of such a computer program product, each event data object within the set of event data objects is further associated with a detected violation of a file storage protocol. In some such example implementations, and in other example implementations, each file information set comprises: an identification of a file name and a file path associated with a file stored on the first workstation; and an indication of the detected violation of the file storage protocol. In some such example implementations, and in other example implementations, generating the consolidated file set comprises: determining that a first file information set and a second file information set are associated with the same file stored on the first workstation; and combining the first file information set and the second file information set into a single entry in the consolidated file set.

In some such example implementations, and in other example implementations, causing the representation of the consolidated file set to be displayed on the user interface of the first workstation comprises: presenting a selectable element associated with a file identified in the consolidated file set, wherein the selectable element is configured to, upon selection by the user, cause the first workstation to open the file associated with the selectable element. In some such example implementations, and in other example implementations, causing the generation of the record associated with the action performed by the user comprises causing an indication of the action performed by the user to be associated with each event data object associated with the file.

BRIEF DESCRIPTION OF THE DRAWINGS

Figure 1A:
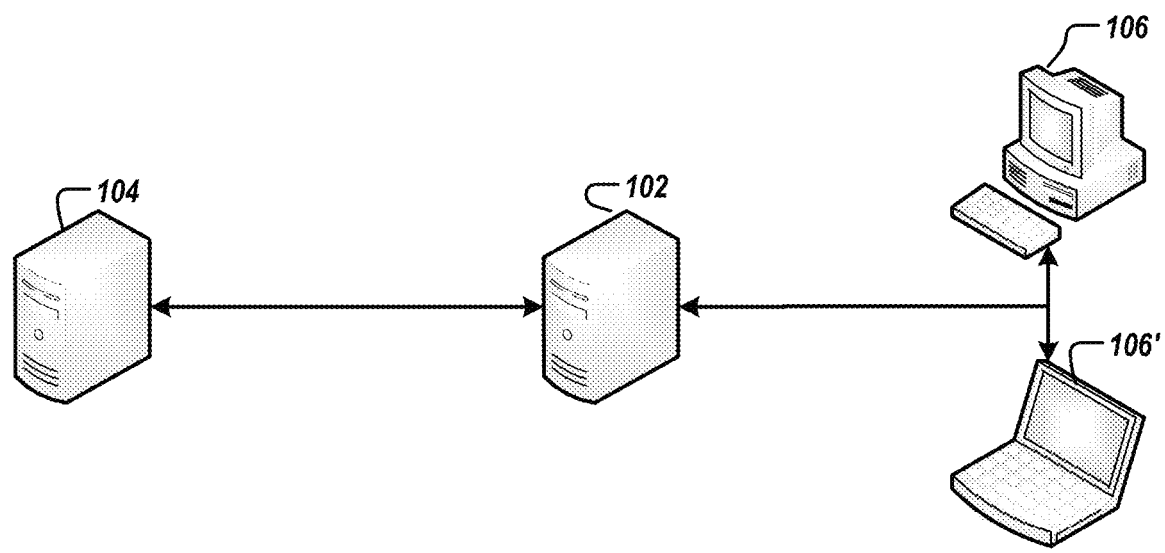
Figure 1B:
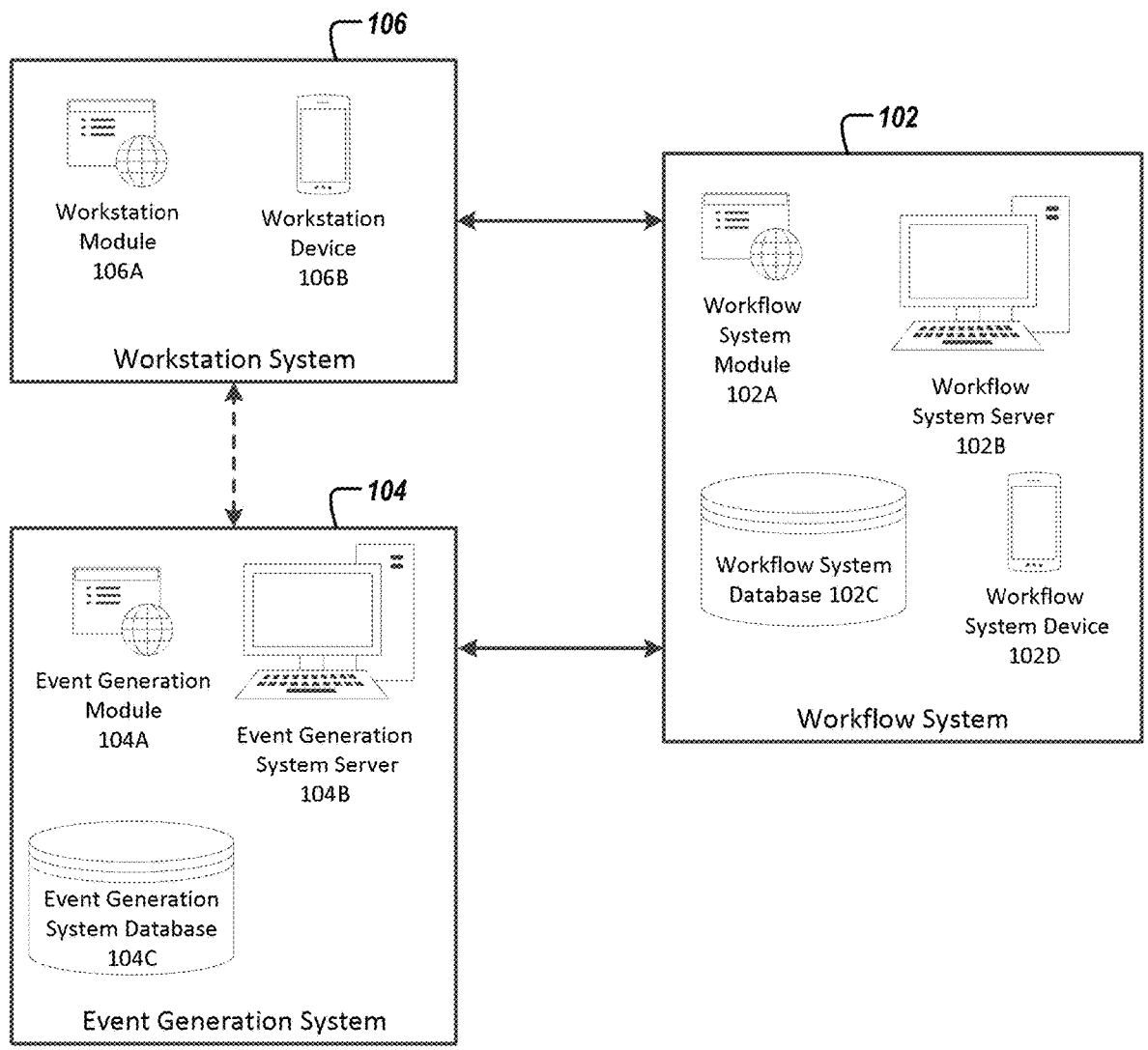
Figure 2:
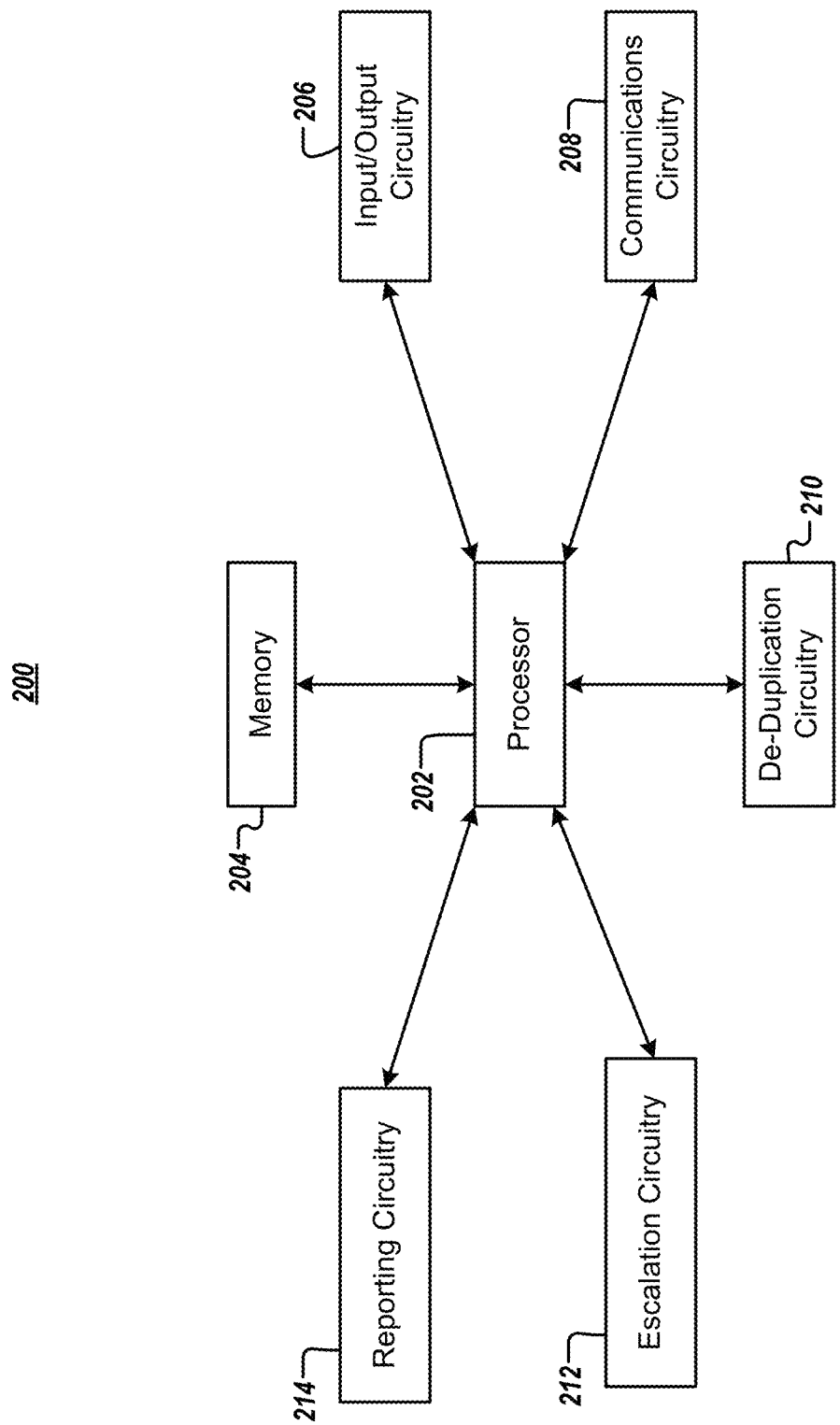
Figure 3:
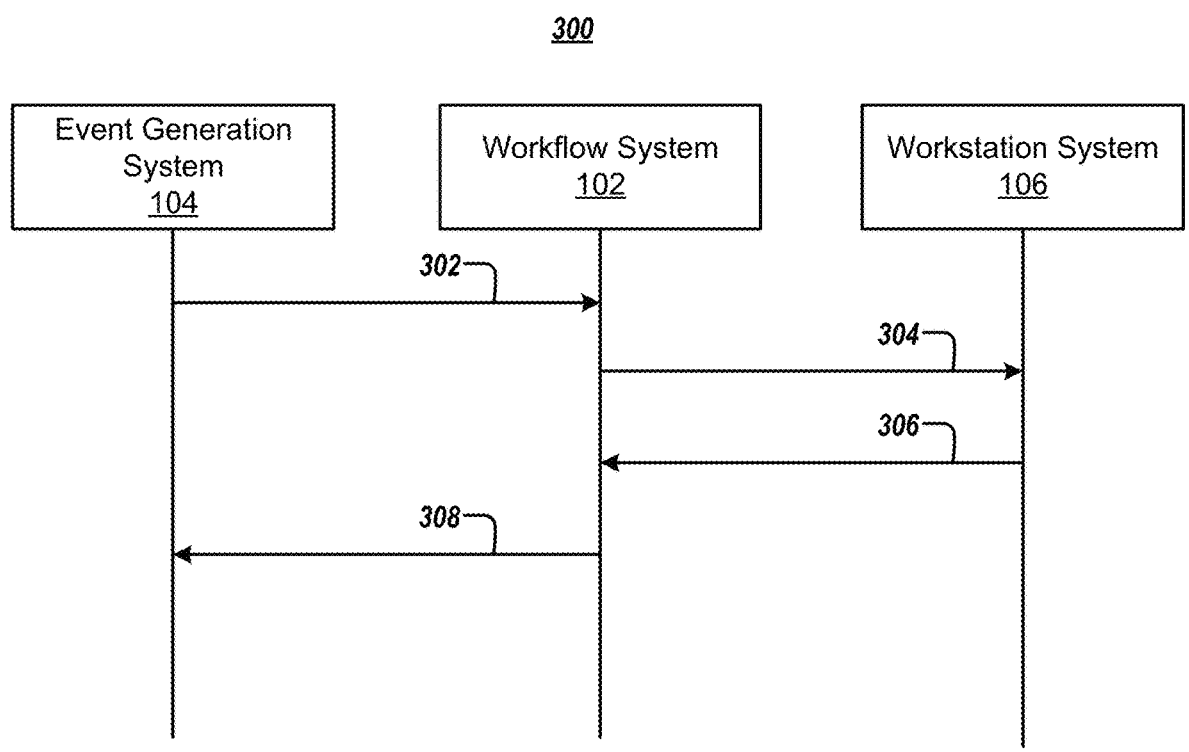
Figure 4:
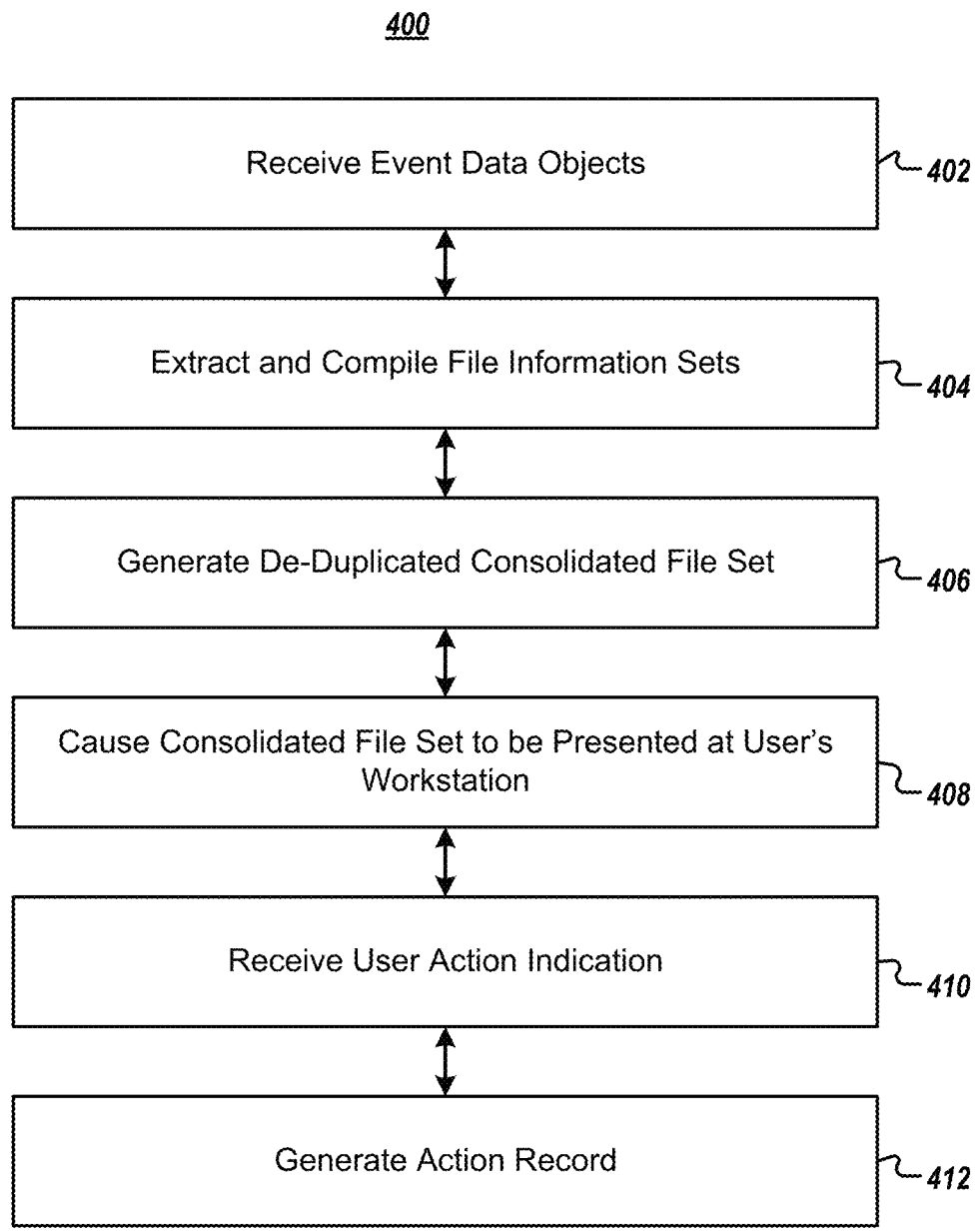
Figure 5:
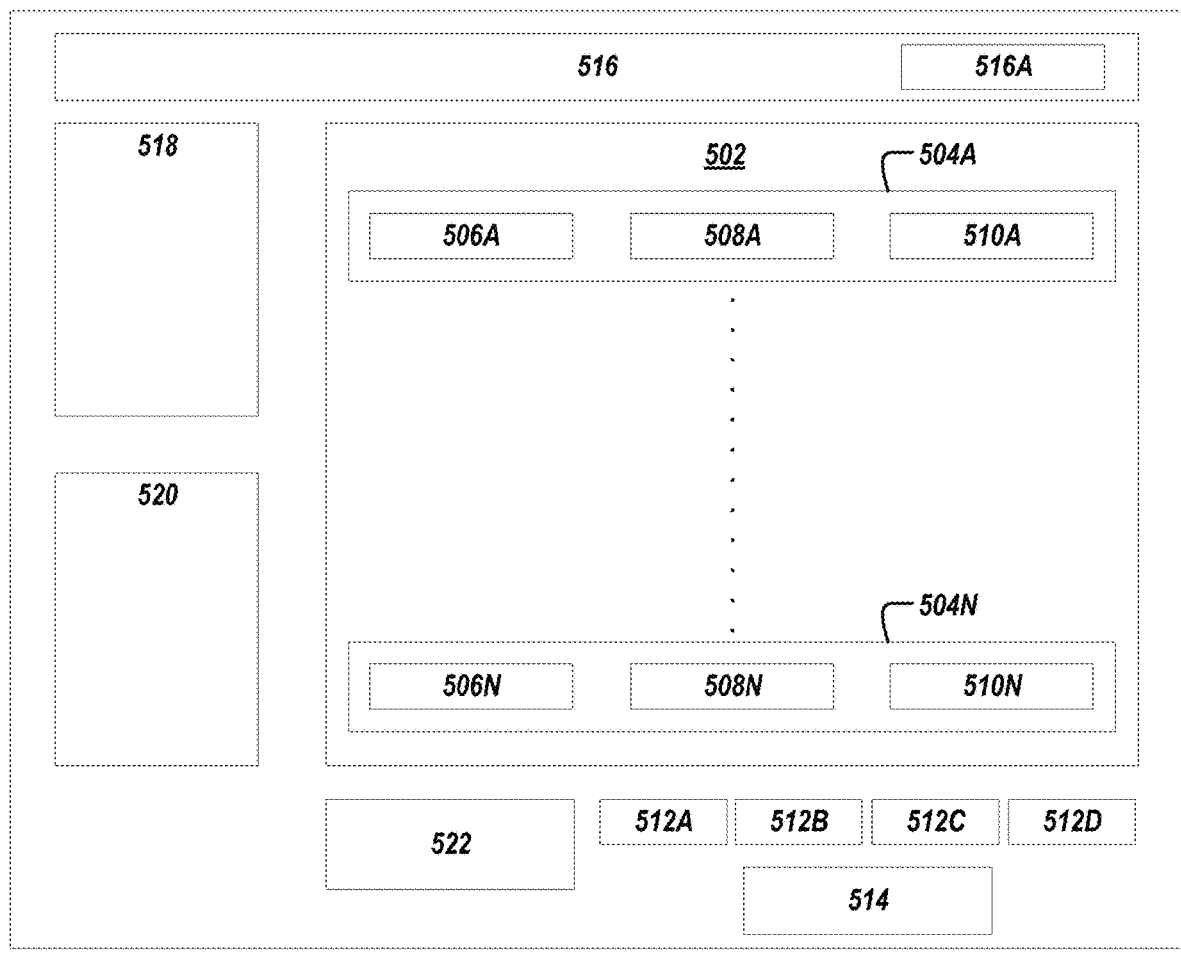

Having thus described certain embodiments of the present invention in general terms, reference will now be made to the accompanying drawings, which are not necessarily drawn to scale, and wherein:

FIG. 1A illustrates an example system within which some embodiments of the present invention may operate;

FIG. 1B illustrates a more detailed diagram of the system described in connection with FIG. 1A;

FIG. 2 illustrates a block diagram of an example device for implementing an improved network data security enforcement and verification system using special-purpose circuitry in accordance with some embodiments of the present invention;

FIG. 3 illustrates an example data flow interaction between elements of an example environment for enforcing and verifying network security protocols in accordance with some embodiments of the present invention;

FIG. 4 illustrates a flowchart describing example operations for implementing an improved network data security enforcement and verification system in accordance with some embodiments of the present invention;

FIG. 5 illustrates a block diagram of an example interface that may be generated and used in accordance with some embodiments of the present invention; and FIG. 6 illustrates an example log that may be generated and used in accordance with some embodiments of the present invention.

DETAILED DESCRIPTION

Some embodiments of the present invention will now be described more fully herein with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

Overview

Various embodiments of the present invention are directed to improved apparatuses, methods, and computer program products for implementing, enforcing, and verifying network security protocols that apply to files that may be stored on a workstation within a network environment. In this regard, embodiments of the present invention provide systems, devices, and frameworks that generate an interface in which a user can view, assess, and operate on files that may be subject to one or more data loss prevention protocols on a file-by-file basis, while capturing the actions taken by the user in a manner that allows for a user's actions on a single file to be associated with all of the protocols (and any related data loss prevention records) associated with the given file.

The inventors of the inventions disclosed herein have recognized that one of the key factors in limiting the risk that files containing potentially sensitive data will be lost, breached, and/or otherwise subjected to unauthorized access and viewing is the routine and efficient enforcement of data loss prevention protocols at the workstations where users may access, view, maintain copies of and/or otherwise work with such files. In many network environments, workstations (such as laptop and/or desktop computers, mobile devices, and/or other network terminals, for example) may be used to access, view, edit, store, and/or otherwise work with files that may contain potentially sensitive information. For example, in the context of a network associated with a hospital and/or other medical services provider, workstations may be used to work with files that may include information that is sensitive on an individual level (such as patient records, billing records, information regarding an individual's identity, and the like, for example) and on other levels, such as information regarding the medical, supply-chain, human resources, financial, and/or other operations of the hospital and/or other service provider. Since legitimate users of such information often need to access and work with some such information on an ongoing basis, files containing potentially sensitive information may, from time to time, be stored at least temporarily on one or more workstations.

While modern data loss prevention protocols and techniques are typically capable of hardening file services and other network components from conventional attacks and other attempts to gain unauthorized access to information, workstations are often more difficult to secure. In particular, one of the challenges to securing workstations resides in the need for individual users to periodically review the files that are present on a given workstation and take steps (such as the deletion and/or movement of files, for example) to secure files containing potentially sensitive information. Conventional approaches to notifying workstation users of the presence of potentially sensitive information on a workstation and enforcing the relevant data loss prevention protocols are subject to a number of technical challenges that the inventors of the inventions described and disclosed herein have identified and overcome.

Conventional approaches to enforcing data loss prevention protocols on workstations in a network environment typically rely on a remote server that periodically scans multiple workstations within an environment and generates a report, or "event" for each instance where a file triggers a rule that is associated with potentially sensitive information. For example, again in the context of a hospital and/or medical services provider, a legitimate user (such as a doctor, for example) may have a file stored on a workstation that includes notes about a patient's condition, medical history, and/or other potentially sensitive information that may be subject to HIPAA and/or other regulatory requirements. In another example, a hospital administrator may have files stored on his or her workstation that include employee names, addresses, social security numbers, financial information, and/or other potentially sensitive information. Likewise, a user tasked with managing financial operations may have files stored on a workstation that include credit card information, billing information, and/or other potentially sensitive information. Since many conventional data loss prevention systems are configured to generate an event for each instance where potentially sensitive information is located within a file, a single file (such as a file that contains social security information, insurance information, medical information, and credit card information, for example) may be the subject of numerous events, all of which can be address by a single action (such as the deletion or movement of the file, for example). In situations where numerous events are generated, it can become difficult for users and related systems to verify that the proper action has been taken to resolve a given event.

The redundancy inherent in many conventional data loss prevention systems also compounds the technical challenges associated with presenting relevant information to a user. In many environments, the output to a user from a conventional data loss prevention system consists of a lengthy spreadsheet that, in addition to the redundancies caused by the generation of multiple alerts, requires the user to manually navigate through the file system of the workstation to locate and act upon the potentially relevant file or files. As a result, conventional systems are prone to error, at least in the sense that a user may fail to locate the relevant file and/or inadvertently operate on the wrong file. Moreover, in situations where a user perceives the compliance with data loss prevention protocols as particularly onerous (such as when confronted with numerous redundant events and/or a particularly difficult-to-navigate file structure, for example) the likelihood that a user will fail to comply with data loss prevention protocols increases.

To address these and other technical challenges associated with accurately and efficiently identifying potentially sensitive files and enforcing data loss prevention protocols on workstations in a network environment, example embodiments described and/or otherwise disclosed herein contemplate using a workflow server to de-duplicate and otherwise process events received from a data loss prevention server (or another event generation system) and to cause an interface to be presented on a workstation that allows the user to view and operate on files that are the subject of one or more alerts in an efficient and consolidated manner.

FIG. 1A presents a block diagram of a simplified example network environment 100 that includes a workflow system 102, an event generation system 104 (which may incorporate, for example, a data loss prevention server), and multiple workstation systems (which are marked as workstation systems 106 and 106'). It will be appreciated that while only one event generation system 104, one workflow system 102 and two workstation systems 106 and 106' are shown in FIG. 1A for the purposes of clarity, the example network environment may incorporate multiples of each of the elements shown in FIG. 1A, and additional network elements.

In accordance with some example implementations of embodiments performed in connection with example environment 100, the event generation system 104 (which may include a conventional data loss prevention server and/or a data loss prevention server provided and/or operated by a third party, for example) periodically scans the files contained on workstation systems 106 and 106' to identify files that include information that may be subject to the enforcement of one or more relevant data loss prevention rules. Upon detecting such information, the event generation system 104 generates one or more events, which are data objects that may contain, for example, an identification of the filename and/or file path associated with a given file, an indication of the protocol and/or other rule associated with the event, and an identifier of the event itself.

Upon receipt of one or more events from the event generation system 104, the workflow system 102 stores the events in association with a unique identifier (which may be extracted from the event itself and/or otherwise generated by the workflow system 102). In connection with identifying the events, the workflow system 102 may also identify the particular workstation system and/or the user and/or owner of the user account associated with the event and the underlying file. In situations where there are duplicate events (such as when multiple events are generated for a single file, for example) the workflow system 102 identifies one event to be displayed to the user, but augments the event to identify the multiple reasons (such as the relevant rules and/or protocols, for example) that caused the file to be identified in one or more events, and stores the event identifiers for the duplicate events in association with the file and/or shown event, such that an action taken by the user with respect to the file can be used to update and/or otherwise address each of the multiple events generated for a given file. Upon receiving an indication from a related application operating on a workstation of an action taken by a user, the status of all events associated with the relevant file can be updated, and the workflow system 102 may efficiently purge data on the workflow system 102 associated with resolved events.

As such, in some example implementations, the workflow system 102 stores event data and/or related metadata on a per-event, per-workstation system, and/or per-file owner basis. In some such example implementations, in connection with receiving and/or otherwise loading event data from an event generation system 104, the workflow system 102 de-duplicates the events, allowing for only one consolidated record of an event to be displayed to a user of a workstation, while maintaining references to the duplicate events to allow for status updates on an event-by-event basis. Moreover, the workflow system 102 may serve files that require action by a file owner and/or other user via an interface generated in connection with a client application operating on the relevant workstation. Upon receiving status updates from the client application, the workflow system 102 may then provide updates to the event generation system 104 and remove the relevant records from the workflow system.

As noted above, the workflow system 102 works in conjunction with a client application operating on the workstation systems 106 and 106' to, among other operations, cause an interface to be presented to a user of the workstation system that allows the user to view, operate on, and otherwise address the data loss prevention concerns underlying the generation of one or more events. In some example implementations, upon startup of the relevant workstation system 106, the client application running on workstation system 106 will determine whether there is a connection between the workstation system 106 and the workflow system 102. In some such example implementations, if a connection is detected, the workstation system 106 and the workflow system 102 will communicate and cooperate to present an interface to the user to allow for the relevant files to be addressed by the user. In some example implementations, if no connection is detected, the workstation system 106 will periodically check to see if a connection to workflow system 102 has been established.

In example implementations where the client application running on workstation system 106 (and in communication with workflow system 102) determines that there are files to be addressed in connection with enforcing data loss prevention protocols, the workstation system 106 may first confirm that the files at issue are still stored on the workstation system 106. In some situations, there may be a time interval between the completion of a scan of the workstation system 106 by the event generation system 104, such that the user may have taken actions on the relevant documents during the time interval between the completion of the scan and the establishment of a connection between the workstation 106 and the workflow system 102. In some such example implementations, such as when the relevant files are no longer on the workstation system 106, the workstation system 106 may provide an update to the workflow system 102 to indicate that the issue with the file underlying one or more events received from the event generation system 104 have been resolved.

In other example implementations, where the files associated with one or more events remain on the workstation system 106, the workstation system 106 in connection with instructions and/or other information received from the workflow system 102, will launch an interface through which the user may interact with the files underlying the generated events. In some such example implementations, the interface is structured with a set of selectable elements. One such group of selectable elements provided information about the underlying file, the reason or reasons that file was associated with an event (such as an identification of the relevant data loss prevention protocols and/or other rules that triggered the generation of the event), and/or other information about the file. In some example implementations that are particular advantageous in overcoming the technical challenges associated with allowing a user to identify relevant documents, the file name and/or other identifier associated with a given file may be selectable, such that upon selection by a user, the file is opened in its native application and/or another viewer such that the user may analyze and/or otherwise review the document to assess what action would be appropriate.

In some example implementations, four options (or another number of options) may be presented to a user, depending on the rules associated with a given network as selectable buttons and/or other selectable elements in the user interface. One such option may be to delete the document, such that selection of a button marked "delete" would initiate the process of removing the document from the workstation. Another such option may be to move the document, such that selection of a button marked "move" would initiate a process that would allow the file to be stored elsewhere (such as on secured network-attached storage, for example). Another option may allow a user to select a button to request an exception, which may be appropriate in situations where a user has a particularized need for given file. Another option may allow the user to mark the file as "hold," which may be useful in situations where legal, regulatory, and/or other requirements demand that a file be held in place pending its collection in connection with a legal proceeding and/or another procedure.

In some example implementations, upon selection of the button marked "delete", the process of removing the document from the workstation includes removing the file from the file system index maintained on the particular workstation. It will be appreciated that in some situations, the operating system running on a given workstation is configured such that when a user, in normal operation, opts to "delete" a file, the file is moved to a "recycle bin" or otherwise marked for potential removal until a user takes one or more additional steps to cause the full deletion of the file. As a result, in some conventional systems, a document that a user intended to delete may persist on the workstation in a format that could allow the file to be restored and/or otherwise acquired by an unauthorized user. To overcome the technical challenges associated with such conventional deletion protocols, some example implementations bypass the typical functionality of the workstation's operating system, such that when a user selects the button marked "delete" (or a similar indicator) within the interface, the relevant file is removed from the workstation's file system index. As a result of the file no longer being listed in the file system index, the workstation will tend to use the storage space consumed by the deleted file with other files, such that the deleted file will cease to be recoverable. In some such example implementations, the process of removing the document from the workstation further includes actively overwriting and/or otherwise replacing the deleted file with a dummy file and/or other data set such the deleted file ceases to exist on the workstation.

Regardless of the action selected by the user, some example implementations provide for collecting the user actions (such as in a queue, for example) and providing indications of the actions to the workflow system 102. In some such example implementations, the workflow system 102 may then update the event generation system 104 to indicate how one or more events have been addressed. Moreover, the use of the workflow system 102 to address events may also be logged by the workflow system 102 to allow for further analysis and reporting of efforts to enforce data loss prevention protocols and/or other rules on the workstation system 106.

As such, the workstation system 106 (through the action of the client application, the related interface, and workflow system 102) may overcome many of the technical challenges associated with enforcing and verifying compliance with various data loss prevention protocols and/or other rules in a network environment. In particular, since the workstation system 106 can be configured to only launch the user interface in situations where there are existing files to remediate, the client application may remain dormant for significant periods of time, thus limiting the intrusion into the user experience, and limiting the system resources necessary to address potential data security concerns. Moreover, in situations where the interface displays the filename, file path, and the rule or rules associated with a given file, the user can rapidly assess how to address a given file and the concerns underlying the presence of that file on the workstation system 106. Further, by leveraging the native applications (and/or other file functionality of the operating system associated with the workstation system 106) the interface presented to the user can remain relatively efficient and impose a limited demand on system resources. By allowing a user to view documents (and take action with respect to such documents) directly from the interface, the technical challenges associated with requiring a user to manually locate and process documents identified in a redundant listing of files is alleviated. Further, by providing a mechanism to log and document a user's actions with respect to the relevant files, example embodiments allow for compliance with data loss prevention protocols and/or other rules to be documented, verified, and/or communicated to other systems.

Many of the example implementations described herein are particularly advantageous in situations and other contexts that involve the protection of potentially sensitive data in network environments, such as those that may be associated with a hospital and/or other medical services provider. In some such situations, multiple different groups of legitimate users may need to access, view, and/or interact with large volumes of information that may be highly sensitive to individuals and/or entities on a recurring basis. Consequently, by allowing users to readily take steps to ensure that they comply with data loss prevention protocols and/or other rules, and by providing a mechanism through which such compliance can be tracked and verified, the risk associated with workstation-based data loss can be reduced, and data loss event can be more rapidly tracked to potential sources. As such, and for purposes of clarity, some of the example implementations described herein use terms, background facts, and details that are associated with network environments associated with medical services providers and may reference information, considerations, and other details associated with implementations that may arise in such networks. However, it will be appreciated that embodiments of the invention and example implementations thereof may be applicable and advantageous in a broad range of contexts and situations outside of those related to networks associated with medical services providers.

Example Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As used herein, a "computer-readable storage medium," which refers to a physical storage medium (e.g., volatile or non-volatile memory device), may be differentiated from a "computer-readable transmission medium," which refers to an electromagnetic signal.

As used herein, the terms "user" and/or "client" refer to an individual or entity that is a user of a workstation that may be configured to access and/or store files within a network environment. For example, a user and/or client may be the owner and/or user of files containing information associated with the providing of medical services, including but not limited to information that may be subject to regulatory requirements associated with the protection and preservation of potentially sensitive health and/or identification information.

The terms "workstation" and/or "client device" refer to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

As used herein the term "event" refers to a data object generated by and/or in connection with a data loss prevention server and/or other event generation system based on the identification of certain data, content, and/or other aspects of a file stored on a networked workstation. For example, an event may be generated by a data loss prevention server upon the detection of data within a file that may constitute protected health information, personally identifiable information, financial information, and/or other potentially sensitive information, which may depend on rules and/or other protocols used in connection with the scanning and/or other analysis of files stored on a workstation.

As used herein, the term "data object" refers to a structured arrangement of data. An "event data object" is a data object that includes one or more sets of data associated with an event, such as an event identifier and/or a file information set associated with the relevant event.

As used herein, the terms "data set" or "information set" refer to a collection of data. One or more information sets may be combined, incorporated into, and/or otherwise structured as a data object. A "file information set" is a data set that includes information associated with a file underlying a given event, such as a filename, file path, and/or an indication of the rule or other protocol associated with the event triggered by a review of the file. A "consolidated file set" is a data set that contains a de-duplicated plurality of file information sets. In some example implementations, a consolidated file set incorporates modified file information sets that are constructed to capture, in a single file information set, the non-duplicative data associated with multiple events triggered by the same file.

Example System Environment

FIG. 1B shows a more detailed depiction of example system environment 100 (which was presented in FIG. 1A) in which implementations involving the efficient enforcement and/or verification of data loss prevention protocols may be realized. The depiction of environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1B and the environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1B are shown as discrete, separate elements, other configurations may be used in connection with the methods, apparatuses, and computer programs described herein, including configurations that combine, omit, and/or add aspects and/or components.

Embodiments implemented in a system environment such as system environment 100 advantageously provide for the receiving of a set of event data objects associated with a given workstation, the extraction of file information sets from the set of event data objects and compiling a plurality of file information sets, the generation of a consolidated file set, causing a representation of the consolidated file set to be displayed on a user interface of the first workstation, receiving an indication of an action performed by a user of the first workstation on a file identified in the consolidated file set, causing the generation of a record associated with the user's action, and/or the other actions described, contemplated, and/or otherwise disclosed herein.

As shown in FIG. 1B, a workflow system 102 includes an online workflow system module 102A which is configured to receive, process, transform, transmit, and evaluate event data objects, the content and other information associated with such data objects, other data sets, and related interfaces via a web server, such as workflow system server 102B and/or workflow system device 102D. The workflow system server 102B and/or workflow system device 102D are connected to any of a number of public and/or private networks, including but not limited to the Internet, the public telephone network, and/or networks associated with particular communication systems or protocols, and may include at least one memory for storing at least application and communication programs. In some example implementations, the workflow system will be particularly configured to communicate with at least an event generation system 104 and one or more workstation systems 106.

It will be appreciated that all of the components shown in FIG. 1B may be configured to communicate over any wired or wireless communication network, including a wired or wireless local area network (LAN), personal area network (PAN), metropolitan area network (MAN), wide area network (WAN), or the like, as well as interface with any attendant hardware, software and/or firmware required to implement said networks (such as network routers and network switches, for example). For example, networks such as a cellular telephone, an 802.11, 802.16, 802.20 and/or WiMAX network, as well as a public network, such as the Internet, a private network, such as an intranet, or combinations thereof, and any networking protocols now available or later developed including, but not limited to, TCP/IP based networking protocols may be used in connection with system environment 100 and embodiments of the invention that may be implemented therein or participate therein.

As shown in FIG. 1B, workflow system 102 also includes a workflow database 102C that may be used to store information associated with event data objects, users and/or files associated with event data objects, file information sets, consolidated file sets, other data sets, interfaces associated with any such data objects or data sets, event generation systems, workstation systems, and/or any other information related to the enforcement of one or more data loss prevention protocols, the presentation of an interface to facilitate actions taken with respect to files associated with events, and/or the verification of actions taken in connection with data loss prevention protocols. The workflow system database 102C may be accessed by the workflow system module 102A, the workflow system server 102B, and/or the workflow system device 102D, and may be used to store any additional information accessed by and/or otherwise associated with the workflow system 102 and/or its component parts. While FIG. 1B depicts workflow system database 102C as a single structure, it will be appreciated that workflow system database 102C may additionally or alternatively be implemented to allow for storage in a distributed fashion and/or at facilities that are physically remote from the each other and/or the other components of workflow system 102.

Workflow system 102 is also shown as including workflow system device 102D which may take the form of a laptop computer, desktop computer, or mobile device, for example, to provide an additional means (other than via a user interface of the workflow system server 102B) to interface with the other components of workflow system 102 and/or other components shown in or otherwise contemplated by system environment 100.

Event data objects, file information sets and/or additional content or other information to be associated with one or more event data objects may originate from an event generation system such as event generation system 104. In some example implementations, the event generation system 104 may take the form of a data loss prevention server and/or a related system. A user of event generation system 104 may use an event generation server 104B, event generation system database 104C, and/or a device or interface associated therewith to interface with an event generation module 104A to create, generate, and/or convey an event data object and/or information to be included in an event data object, such as a file information set and/or another data set. The event generation system 104 may (such as through the operation of the event generation module 104A, for example) transmit an event data object to the workflow system 102. While only one event generation system 104 is depicted in FIG. 1B in the interest of clarity, it will be appreciated that numerous other such systems may be present in system environment 100, permitting numerous users and/or other event sources to develop and transmit event data objects and/or information associated with event data objects to workflow system 102.

The event generation system database 104C may be accessed by the event generation system module 104A, and/or the workflow system server 104B, and may be used to store any additional information accessed by and/or otherwise associated with the event generation system 104 and/or its component parts. While FIG. 1B depicts event generation system database 104C as a single structure, it will be appreciated that event generation system database 104C may additionally or alternatively be implemented to allow for storage in a distributed fashion and/or at facilities that are physically remote from the each other and/or the other components of event generation system 104.

As shown in FIG. 1B, system environment 100 also includes workstation system 106, which comprises a workstation module 106A, and a workstation 106B, While only one workstation system 106 is depicted in FIG. 1B in the interest of clarity, it will be appreciated that numerous additional such systems may be present in system environment 100, permitting numerous users to communicate and/or otherwise interact with the workflow system 102 and/or one or more event generation systems 104. As shown in FIG. 1B, the workstation system 106 is capable of communicating with workflow system 102 to receive information associated with events and/or the files underlying one or more event that the workflow system 102 may provide when enforcing one or more data loss prevention protocols and/or other related rules. For example, workstation system 106 may, such as via the capabilities and/or actions of the workstation module 106A and/or workstation device 106B, receive information necessary to render an interactive user interface on a display presented to a user, such that the user may assess files associated with one or more data loss prevention protocols and/or other rules, assist the user in implementing responsive actions, and provide to the workflow server an indication of the action taken.

Workstation system 106 is also shown as optionally being capable of communicating directly with event generation system 104. In some situations, such as when a given event generation system is responsible for directly scanning files stored on one or more workstation systems 106 in connection with data loss prevention protocols, it may be more efficient and/or otherwise more efficient for the event generation system 104 to directly or near-directly access the relevant workstation system 106 to analyze files for compliance with relevant data loss prevention protocols and/or other rules.

Overall, and as depicted in system environment 100, workflow system 102 engages in machine-to-machine communication with event generation system 104 and workstation system 106, via one or more networks, to facilitate the processing of event data objects associated with one or more files stored on workstation system 106, such that one or more data loss prevention protocols and/or other rules may be enforced and that actions taken in connection with enforcing such rules may be verified and recorded.

Example Apparatus for Implementing Embodiments of the Present Invention

It will be appreciated that the workflow system 102 may be embodied by one or more computing systems, such as apparatus 200 shown in FIG. 2. As illustrated in FIG. 2, the apparatus 200 may include a processor 202, a memory 204, input/output circuitry 206, communications circuitry 208, de-duplication circuitry 210, escalation circuitry 212, and reporting circuitry 214. The apparatus 200 may be configured to execute any of the operations described herein, including but not limited to those described in connection with FIG. 1A, FIG. 1B, FIG. 3, FIG. 4, and FIG. 5.

Regardless of the manner in which the apparatus 200 is embodied, the apparatus of an example embodiment is configured to include or otherwise be in communication with a processor 202 and a memory device 204 and optionally the input/output circuitry 206 and/or a communications circuitry 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include input/output circuitry 206, such as a user interface that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 204, and/or the like).

The apparatus 200 may optionally also include the communication circuitry 208. The communication circuitry 208 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

As shown in FIG. 2, the apparatus may also include de-duplication circuitry 210. The de-duplication circuitry 210 includes hardware, firmware, and/or software configured to maintain, manage, and provide access to a de-duplicated list of files associated with one or more event data objects received from a data loss prevention server and/or other event generation system 104. The de-duplication circuitry 210 may provide an interface, such as an application programming interface (API), which allows other components of a system to extract file information sets and/or other information from event data objects, recognize when multiple events are associated with a single filename and file path, and maintain a list of event data objects associated with the relevant file. For example, the de-duplication circuitry 210 may form one or more file information sets and/or consolidated file sets that incorporate a set of non-duplicative material associated with a file, such that a user may be presented with an indication of all of the protocols or rules associated with a given file that is the subject of multiple event data objects.

The escalation circuitry 212 includes hardware, firmware, and/or software configured to manage, store, process, and analyze information (such a consolidated file sets, file information sets, and/or event data objects) used in connection with providing a user interface to a user of a workstation that facilitates the performance of one or more actions on files identified in one or more event data objects. In some example implementations, escalation circuitry 212 is configured to provide instructions to a workstation system 106 such that, upon receipt of the instructions, an interface is presented to a user of the workstation system 106 that presents the information contained in a consolidated file set to a user in an interface that allows the user to view, delete, move, and/or take other action with respect to an identified file to comply with a data loss prevention protocol and/or other rule.

The reporting circuitry 214 includes hardware, firmware, and/or software configured to manage, store, process, and analyze information associated with user actions taken in connection with one or more files presented in a user interface as part of a consolidated file set and/or other set of information associated with the enforcement of one or more data loss prevention protocols and/or other rules. For example, upon receiving an indication that a user has moved, deleted, requested an exception, and/or otherwise indicated that a particular file is subject to a hold or other restriction, reporting circuitry 212 may cause information to be conveyed to an event generation system 104 indicating that all of the events associated with a given file have been addressed, and, in some example implementations, providing a record of how the event has been addressed.

Example Processes for Data Loss Prevention Protocol Enforcement

FIG. 3 is a block diagram showing an example data flow 300 that may be used in connection with the efficient enforcement and verification of data loss prevention protocols and/or other rules in a network environment. As shown in FIG. 3, workflow system 102 is configured to receive an event data object from an event generation system 104 (such as a third-party data loss prevention system, for example) in the form of message 302. In some example implementations, the event generation system 104 may provide a plurality of event data objects to the workflow system 102, such as all of the events generated in the course of performing a scan of files stored on the workstation system 106.

In some example implementations, upon receipt of a plurality of event data objects from the event generation system 104, the workflow system 102 acts to mitigate the inefficiencies that often result from the generation of an individual event data object for each instance of a potential violation of a data loss prevention protocol and/or other rule by a given file. In some such implementations, the workflow server 102B extracts file information sets (which may include, for example, a filename, a file path, an identification of a relevant protocol, and/or other information associated with a file that is the subject of an event data object. In instances where the workflow system 102 recognizes multiple events associated with the same filename and file path, the workflow server 102B may combine and/or otherwise edit a file information set to reflect the multiple protocols and/or other rules associated with the file, such that a single record of the file can reflect all of the reasons that the file may be the subject of an event data object. By de-duplicating the event data objects the workflow system 102 may create a consolidated file set that includes an identification of all of the files on a given workstation that are the subject of one or more data loss prevention protocols and/or other rules.

As shown in FIG. 3, the workflow system 102, through the operation of the workflow system server 102B and/or the workflow system module 102A, transmits, in the form of message 304, a message that causes a representation of the consolidated file set to be displayed on a user interface of the workstation system 106. As discussed herein, one of the approaches that embodiments of the invention described and otherwise disclosed herein take to overcome the technical challenges and other inefficiencies present in conventional data loss prevention systems is the generation and use of a user interface (an example of which is presented in connection with FIG. 5) that allows a user to view the relevant file and take action with respect to the file from the interface, without requiring the user to navigate a complicated file system.

As the user works within the user interface presented on workstation system 106, the actions taken by the user are stored, and, as shown at message 306, indications of such actions are transmitted back to the workflow system 102. By doing so, the workflow system 102 is able to associate the actions taken by the user with each event associated with a given file. As a result, a single action taken by a user with respect to one file can be translated, by the workflow system 102, into records that can be associated with the multiple events generated in connection with the single file, without requiring the user to take and/or indicate multiple redundant actions. As shown at message 308, upon associating the received user action with each relevant event data object, the workflow system can convey the relevant action information to the event generation system 104 to ensure that the events generated in connection with a given file are updated to reflect and/or otherwise record the user's action in response to the generated events.

FIG. 4 is a flow chart of an example process 400 for efficiently enforcing data loss prevention protocols and/or other rules in a network environment. As shown at block 402, process 400 begins with receiving, at a workflow system, a set of event data objects, wherein each event data object within the set of event data objects is associated with a first workstation. As discussed herein, a data loss prevention server and/or other event generation system may periodically scan the files stored on a given workstation to identify files that may be subject to one or more data loss prevention protocols. In some example implementations, the data loss prevention protocols may include file storage protocols, such that an event is generated when a violation of the file storage protocol is detected. For example, the relevant protocols may indicate that files containing personal health information, credit card information, personally identifiable information, other financial and/or personal information, and/or other potentially sensitive information should not be stored on a workstation. Upon detection of a file that contains such information, the event generation system may generate one or more event data objects. As discussed herein, an event data object may include one or more file information sets, and/or otherwise contain information sufficient to identify a filename, file path, and/or an indication of a rule and/or protocol associated with the event. In many example implementations of the network environments shown herein, the scanning of files is done on a workstation system and/or user account basis, such that the files associated with an individual user and/or individual workstation system can be evaluated, identified, and made the subject of one or more events in a manner that allows a single user to address the events associated with the files that they use in a batched fashion.

As shown at block 404, process 400 continues with the compiling of a plurality of file information sets. In some example implementations of block 400, the plurality of file information sets is compiled by a workflow system by extracting a file information set from each of the received event data objects. As discussed, herein a file information set generally includes information sufficient to identify a particular file and a protocol and/or rule that triggered the generation of the event for the particular file. In some example implementations, the file information set includes an identification of a filename and file path associated with a file stored on the relevant workstation. In some situations, the incorporation of a filename and file path in a file information set facilitates the de-duplication of events that is often endemic to conventional data loss prevention systems. Moreover, in situations where the file information set also includes an indication of the detected violation of a file storage protocol, additional information may be supplied to a user to facilitate the determination of whether a given file should be deleted, moved, and/or otherwise acted upon with respect to a given workstation.

As shown in block 406, the process 400 involves generating a consolidated file set associated with the first workstation based at least in part on the plurality of file information sets. In some example implementations of process 400, the efficiency of the enforcement of data loss prevention protocols and/or other rules in a network environment can be significantly improved by eliminating the redundancies associated with conventional data loss prevention systems. For example, in some implementations of block 406, a de-duplicated, consolidated file set may be generated, at least in part, by determining that a first file information set and a second file information set are associated with the same file stored on the relevant workstation, and by combining the first file information set and the second file information set into a single entry in the consolidated file set that reflects a non-redundant version of the information contained in both information sets. For example, the single entry may include the filename, file path, and multiple indications of file storage protocols and/or other rules associated with the events generated for the single file.

As shown in block 408, the process 400 also includes causing a representation of the consolidated file set to be displayed on a user interface of the first workstation. As discussed herein, and as shown in FIG. 5, some example implementations involve causing a user of the workstation to be presented with an interface that features multiple selectable elements, such that the user can view a file from the consolidated file set (such as by causing the file to be launched in its native application, for example), review the reasons that the file was included in a consolidated file set, take actions with respect to one or more files, and/or review a history of the actions taken by the user with respect to one or more files.

As shown in block 410, the process 400 also includes receiving an indication of an action performed by a user of the workstation on a file identified in the consolidated file set. As discussed herein, some example implementations of the interface presented to the user allow the user to select a button and/or other selectable object in the interface to move, delete, request an exception for, indicate a hold condition, and/or otherwise take action with respect to the identified file. In some example implementations of block 410, upon the selection of such a button (or the performance of another action) by the user, an indication of the action is transmitted from the workstation to the workflow system (such as to a workflow server, for example), such that the workflow system may document the action taken by the user with respect to the file and its one or more related event data objects.

As shown in block 412, the process 400 also includes causing the generation of a record associated with the action performed by the user. In some example implementations of block 412, the record of the action may be maintained at the workflow server and/or data storage accessible by the workflow server. In other example implementations of block 412, the workflow server and/or other network component may cause an indication of the action performed by the user to be associated with each data object associated with the relevant file. As such, in situations where a data loss prevention server and/or other event generation system generated multiple event data objects for a single file, each event data object may be updated with the information describing the action taken by the user to address the issues underlying the generation of the events.

Example User Interface

FIG. 5 depicts a block diagram of an example interface 500 that may be generated and presented to a user of a workstation to allow the user to view and take action with respect to the files identified in the event data objects generated by a data loss prevention server and/or other system tasked with scanning the files on a workstation and identifying potential violations of one or more data loss prevention protocols and/or other rules. One of the significant features of the interface 500 is the file listing window 502, which is used to present multiple listings 504A-504N of the files and related information contained in a consolidated file set.

As shown in FIG. 5, file listing window 502 presents one or more listing 504A-504N, each of which contain multiple selectable elements 506A-N, 508A-N, and 510A-N. In some example implementations, selectable element 506 is a selectable identification of a filename and/or file path associated with a file identified in one or more event data objects. In some such example implementations, a user may hover a cursor and/or other control element (such as the pointer associated with a mouse, for example) to cause the file path to be displayed to the user. Upon clicking on and/or otherwise selecting the element 506, the file is opened in the files native application and/or other tool created for its viewing. In some situations, such as when a particular file type is not assigned to a native application and/or other tool that allows it to be viewed in a human-readable format, a file explorer window and/or other tool (depending on the operating system used in connection with the workstation) may be launched to allow the user to select an application and/or other tool to view the file.

In some example implementations of the interface 500, elements 508A-508N may be used to indicate the file type, such as .txt, .htm, .doc, .xls, .pdf, and/or other file type associated with the file presented in a given listing. In some example implementations of the interface 500, elements 510A-510N may provide an indication of the one or more rules and/or other protocols that triggered the generation of an event data object. In instances where a single file is the subject of multiple event data objects (and multiple potential protocol and/or rule violations, for example), the element 510 associated with a given listing may include multiple indications.

In the example interface 500 shown in FIG. 5, four action buttons, 512A, 512B, 512C, and 512D, are presented. When a user has selected one or more listings 504A-504N, the user may select one of the action buttons 512A-512D to cause an action to be performed on the file associated with the listing. For example, action button 512A may be used to cause the deletion of the file from the workstation, while button 512B may be used to cause the movement of the file from its current location to a different location specified by the user. In some such example implementations, and in other situations, a user may need additional options beyond simply deleting and/or moving a file. For example, button 512C may allow a user to request an exception to one or more rules, and may, in some example implementations, allow a user to enter information explaining why one or more rules or protocols do not apply to a given file and/or should be suspended with respect to the file. In some situations, such as instances where a file and/or workstation may be subject to rules and/or regulations imposed by an external authority, such as a court, investigative entity, and/or other organization, button 512D may be used to allow a user to request that given file be held in place (such as placed under a legal hold, which may be required in the context of litigation, internal and/or external investigations, and/or other situations where preserving the state of a workstation and/or the files contained therein may be necessary).

Regardless of the precise orientation, appearance, and/or functionality of the action buttons 512A-512D, upon the selection of one such button, and in addition to performing the action associated with the button, the interface 500 may cause and indication of the action taken to be stored. As shown in FIG. 5, selectable element 514 may be presented to the user, such that upon selection of the element 514, a log and/or other listing of the actions taken by the user may be presented to the user.

FIG. 5 also shows the example interface 500 containing a number of optional and/or customizable elements. For example, element 516 may include explanatory information regarding the interface 500 and may, in some example implementations incorporate a timer 516A that allows a user to request additional time to return to the interface to complete the actions needed in connection with the listing presented in window 502. In some example implementations, customizable information window 518 may be used to present information, such as instructions, definitions of abbreviations, and/or other information to the user. Likewise, in some example implementations, customizable link window 520 may be used to provide a user with links to internal and/or external content that may assist the user in making determinations regarding the processing of one or more files, for example. In some example implementations, customizable area 522 may be used to present a due date at which a user must have performed one or more action with respect to each of the listings 504A-504N presented in the interface.

Regardless of the precise arrangement and/or appearance of elements in example implementations of interface 500, the interface 500 allows the user to view, access, and take action with respect to files associated with one or more event data object as discussed herein.

As noted herein, such as in connection with the selection of element 514 in FIG. 5, for example, some example implementations are configured to present to the user a log and/or other listing of the actions taken by the user to address one or more events. FIG. 6 presents an example log 600 that demonstrates some of the information and/or arrangement of information that may be presented to a user. In FIG. 6, example log 600 is arranged as a spreadsheet-type listing where each row is associated with a given action and information relating to a given action is presented in rows 602, 604, 606, and 608. In some example implementations, it may be advantageous to include in the example log 600 listings for each instance where the relevant workflow system provides a consolidated file set and/or other listing of potentially relevant files to the workstation, as well as each instance where a user took an action (such as through the selection of one of action buttons 512A-512D, for example) with respect to a file listed in the relevant interface.

As shown if FIG. 6, column 602 may be used to store the date on which a given action was performed. Any approach to expressing a date may be used in connection with storing date information in column 602, including but not limited to formats such as YYYY-MM-DD, MM-DD-YYYY, and/or MM-DD (where "MM" refers to a numeric indication of the month, "DD" refers to a numeric indication of the day, and "YYYY" refers to a numeric indication of the year). Words and/or abbreviations may also be used to express the date. As shown in column 604, in FIG. 6, the example log 600 is also configured to capture and/or express the time at which at given action was performed. The precision to which the time may be captured and stored with respect to column 604 may vary depending on the capabilities of the given workstation. However, it may be advantageous to capture the hour, minute, second, and/or fraction of a second at which an action occurred, so as to be able to pinpoint the timing and/or sequence of multiple actions.

As shown in columns 606 and 608, the example log 600 is also configured to capture and/or express descriptions of the action taken. In some instances, such as when the workflow system provides a list of relevant file, when an interface (such as interface 500, for example) transfers information regarding the actions taken to the workflow system to allow one or more event to be updated, and/or when an extension of time is requested, for example, only one description (which could be stored in column 606, for example) may be necessary. In other instances, such as when a user uses one of action buttons 512A-512D to take action with respect to a file, an indication the action taken (such as causing the file to be deleted, moved, held, or made the subject of a request for an exception, for example) maybe store in column 606. In such a situation, column 606B may be used to provide additional details regarding the action take. For example, if a particular file was marked for deletion, the entry in column 606 may contain a readily readable indication, such as "Delete", and the entry in column 608 may present the file path for the file that was deleted. If the file was moved, for example, the entry in column 606 may read "Move", and the related entry in column 608 may provide the origin and destination file paths for the file. In another example, if the file was marked to be held, column 606 may read "Hold", and a user-provided explanation of the reason or reasons why the file should be held and/or the file path to the file may be presented in column 608. In another example, if an exception was sought, the entry in column 606 may read "Exception", while the entry in column 608 may include information associated with the request for the exception and/or the file path for the file.

Regardless of the precise content of the example log 600, some example implementations allow for the log to be expressed in a human-readable format such that a user may examine and/or verify the actions attributed to the user and/or the workstation with respect to a given file.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a LAN and WAN, an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for securing data files in a network environment, the method comprising:
   receiving, by a workflow system, a set of event data objects, wherein each event data object within the set of event data objects is associated with (a) a first workstation, and (b) a detected violation of a file storage protocol;
   compiling, by the workflow system, a plurality of file information sets, wherein compiling the plurality of file information sets comprises extracting, from each event data object within the set of event data objects, a file information set;
   based at least in part on the plurality of file information sets, generating, by the workflow system, a consolidated file set associated with the first workstation;
   providing, by the workflow system, a presentation for the consolidated file set for display via a user interface, wherein (a) the user interface is executing on the first workstation, (b) the presentation comprises a selectable option for each file of the consolidated file set, and (c) each selectable option allows the user to select an action to be performed for the corresponding file;
   receiving, by the workflow system, an indication of an action performed by a user of the first workstation on a file identified in the consolidated file set; and
   causing, by the workflow system, the generation of a record associated with the action performed by the user.

2. The method of claim 1, wherein each file information set comprises an identification of a file name and a file path associated with a file stored on the first workstation.

3. The method of claim 2, wherein each file information set further comprises an indication of the detected violation of the file storage protocol.

4. The method of claim 3, wherein generating the consolidated file set comprises:
   determining that a first file information set and a second file information set are associated with the same file stored on the first workstation; and
   combining the first file information set and the second file information set into a single entry in the consolidated file set.

5. The method of claim 1, wherein causing the generation of the record associated with the action performed by the user comprises causing an indication of the action performed by the user to be associated with each event data object associated with the file.

6. An apparatus for securing data files in a network environment, the apparatus comprising at least one processor and at least one memory comprising computer program code, the at least one memory and the computer program code configured to, with the at least one processor, cause the apparatus to:
   receive a set of event data objects, wherein each event data object within the set of event data objects is associated with (a) a first workstation, and (b) a detected violation of a file storage protocol;
   compile a plurality of file information sets, wherein compiling the plurality of file information sets comprises extracting, from each event data object within the set of event data objects, a file information set;
   based at least in part on the plurality of file information sets, generate a consolidated file set associated with the first workstation;
   provide a presentation for the consolidated file set for display via a user interface, wherein (a) the user interface executes on the first workstation, (b) the presentation comprises a selectable option for each file of the consolidated file set, and (c) each selectable option allows the user to select an action to be performed for the corresponding file;
   receive an indication of an action performed by a user of the first workstation on a file identified in the consolidated file set; and
   cause the generation of a record associated with the action performed by the user.

7. The apparatus of claim 6, wherein each file information set comprises an identification of a file name and a file path associated with a file stored on the first workstation.

8. The apparatus of claim 7, wherein each file information set further comprises an indication of the detected violation of the file storage protocol.

9. The apparatus of claim 8, wherein generating the consolidated file set comprises:
   determining that a first file information set and a second file information set are associated with the same file stored on the first workstation; and
   combining the first file information set and the second file information set into a single entry in the consolidated file set.

10. The apparatus of claim 6, wherein causing the generation of the record associated with the action performed by the user comprises causing an indication of the action performed by the user to be associated with each event data object associated with the file.

11. A computer program product comprising at least one non-transitory computer-readable storage medium having computer-executable program code instructions stored therein, the computer-executable program code instructions comprising program code instructions configured to:
   receive a set of event data objects, wherein each event data object within the set of event data objects is associated with (a) a first workstation, and (b) a detected violation of a file storage protocol;
   compile a plurality of file information sets, wherein compiling the plurality of file information sets comprises extracting, from each event data object within the set of event data objects, a file information set;
   based at least in part on the plurality of file information sets, generate a consolidated file set associated with the first workstation;
   provide a presentation for the consolidated file set for display via a user interface, wherein (a) the user interface is executing on the first workstation, (b) the presentation comprises a selectable option for each file of the consolidated file set, and (c) each selectable option allows the user to select an action to be performed for the corresponding file;
   receive an indication of an action performed by a user of the first workstation on a file identified in the consolidated file set; and
   cause the generation of a record associated with the action performed by the user.

12. The computer program product of claim 11, wherein each file information set comprises:
   an identification of a file name and a file path associated with a file stored on the first workstation; and
   an indication of the detected violation of the file storage protocol.

13. The computer program product of claim 12, wherein generating the consolidated file set comprises:
   determining that a first file information set and a second file information set are associated with the same file stored on the first workstation; and
   combining the first file information set and the second file information set into a single entry in the consolidated file set.

14. The computer program product of claim 11, wherein causing the generation of the record associated with the action performed by the user comprises causing an indication of the action performed by the user to be associated with each event data object associated with the file.

* * * * *